Aug. 5, 1958
Y. C. SUEL
2,846,638
MOTOR CONTROL SYSTEM
Filed Oct. 19, 1953
5 Sheets-Sheet 1
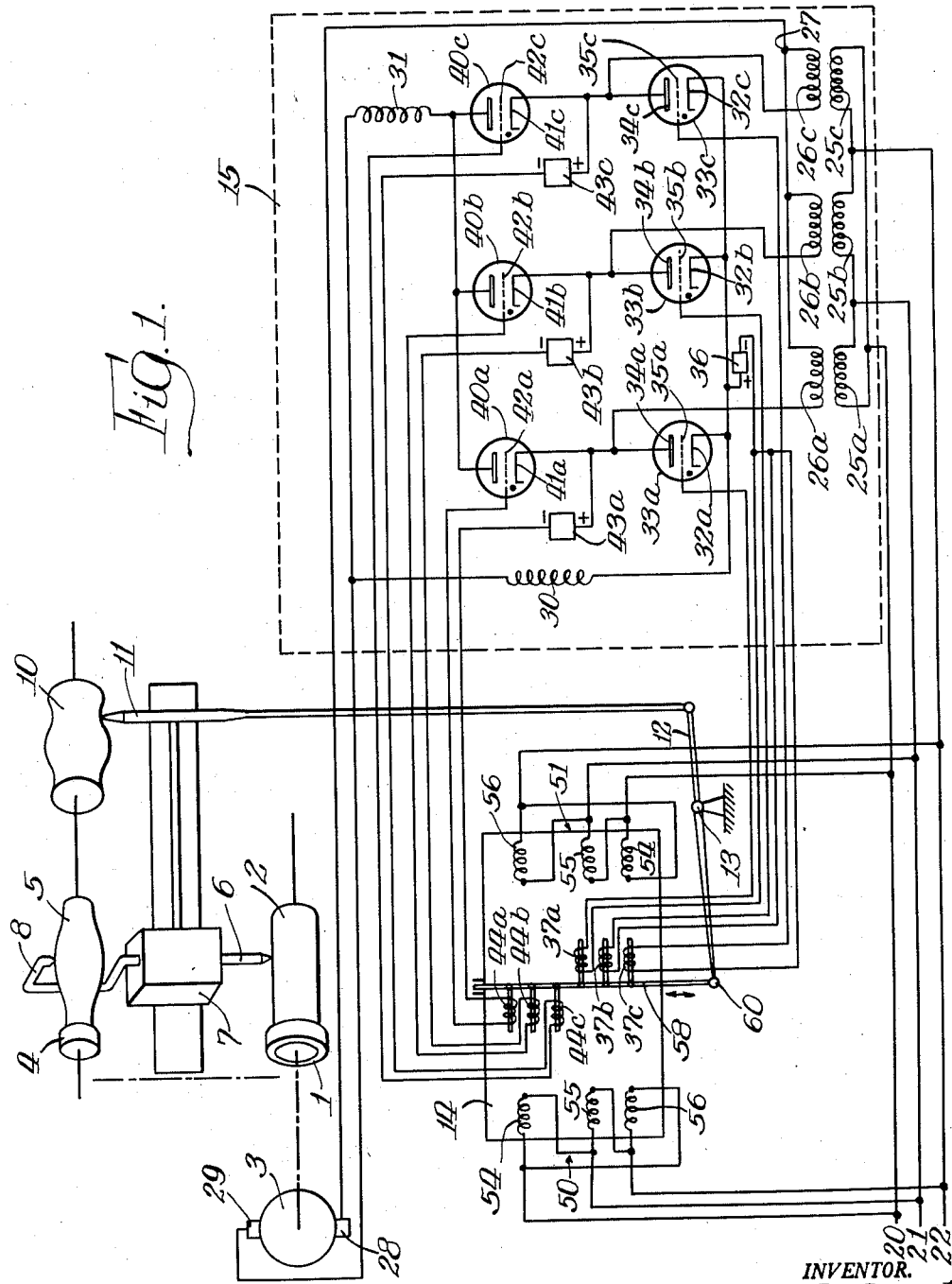
INVENTOR.
Yves C. Suel,
BY
Mueller and Aichele
Atty's.

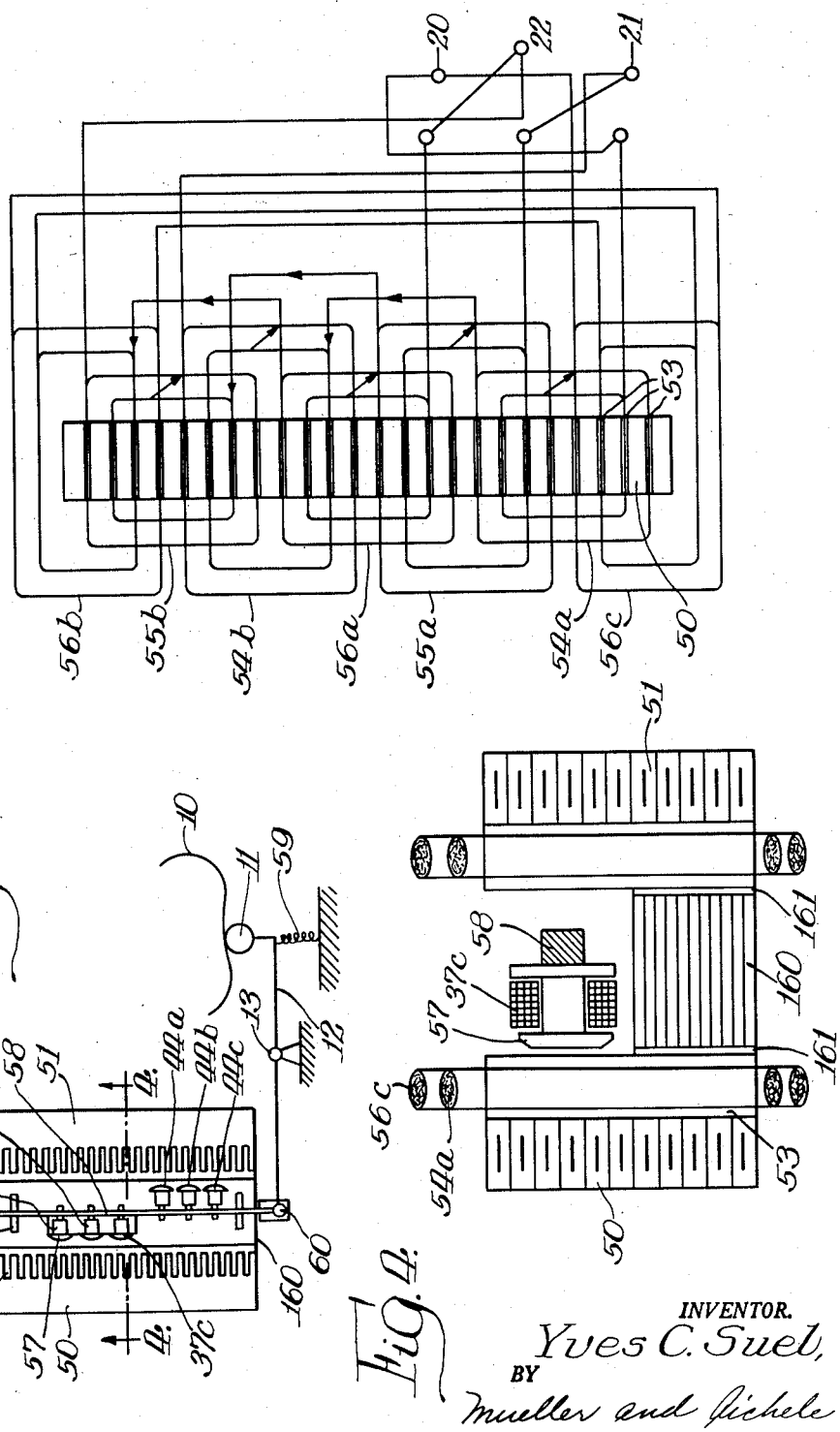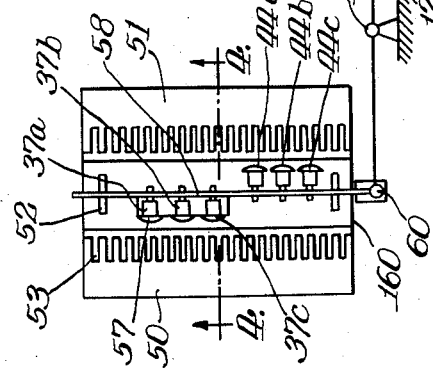

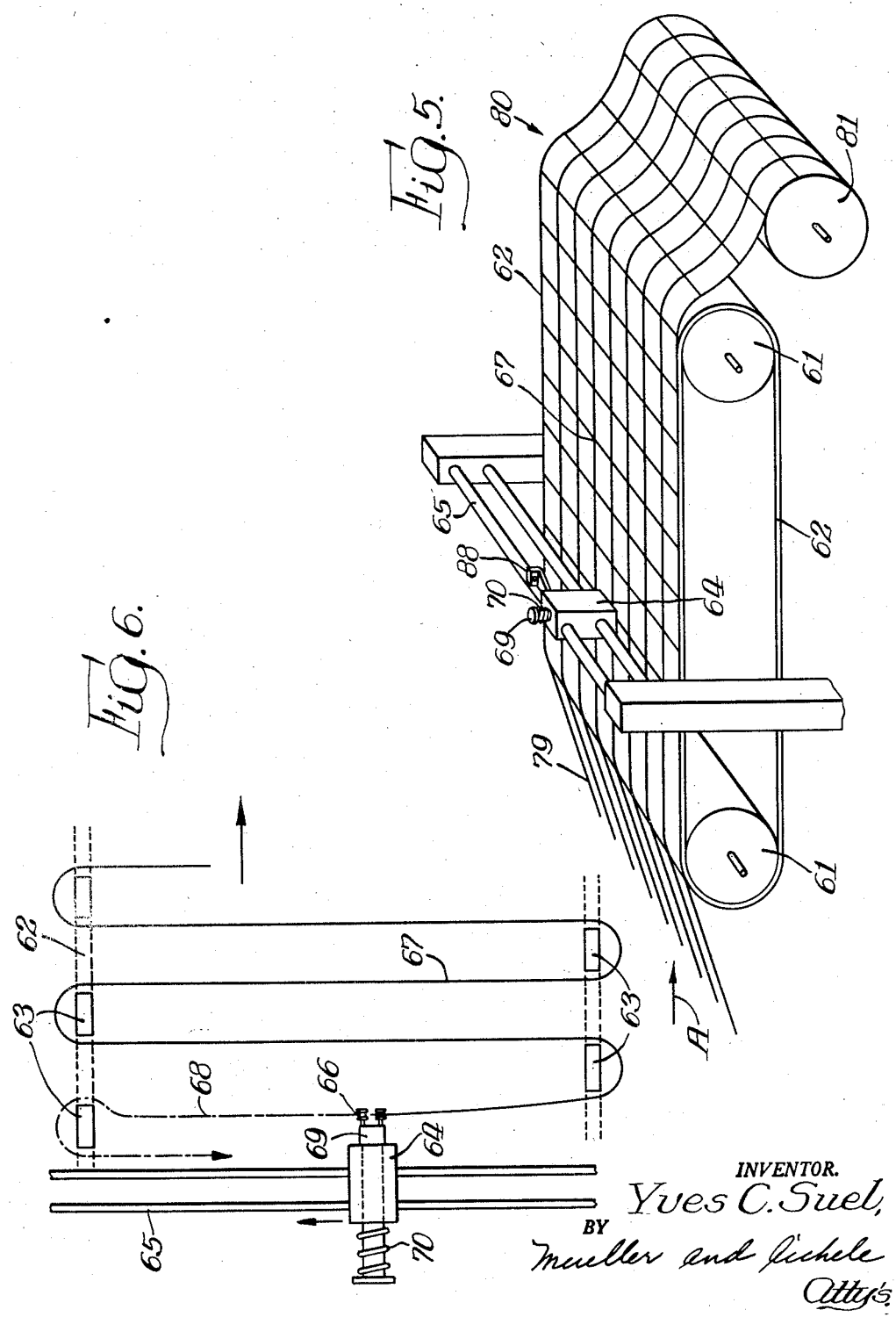

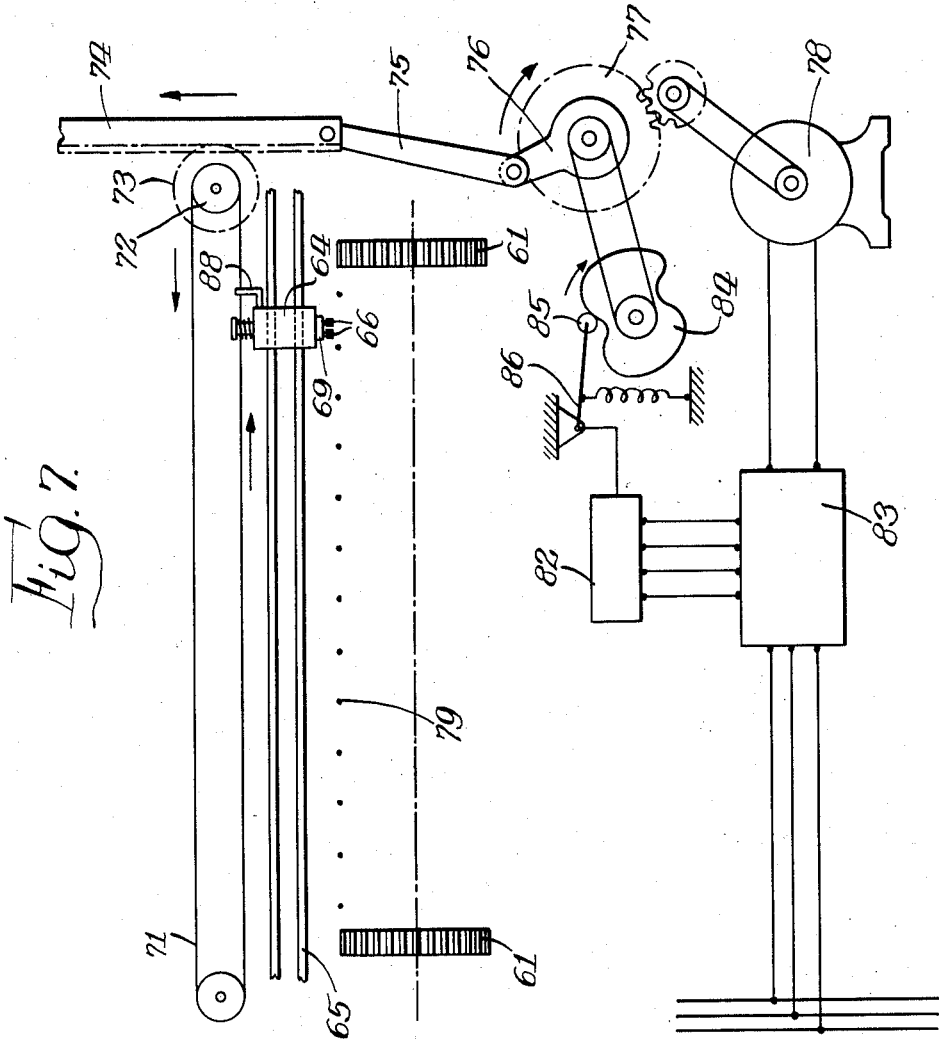
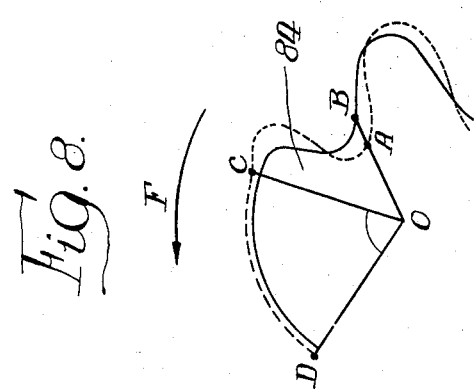

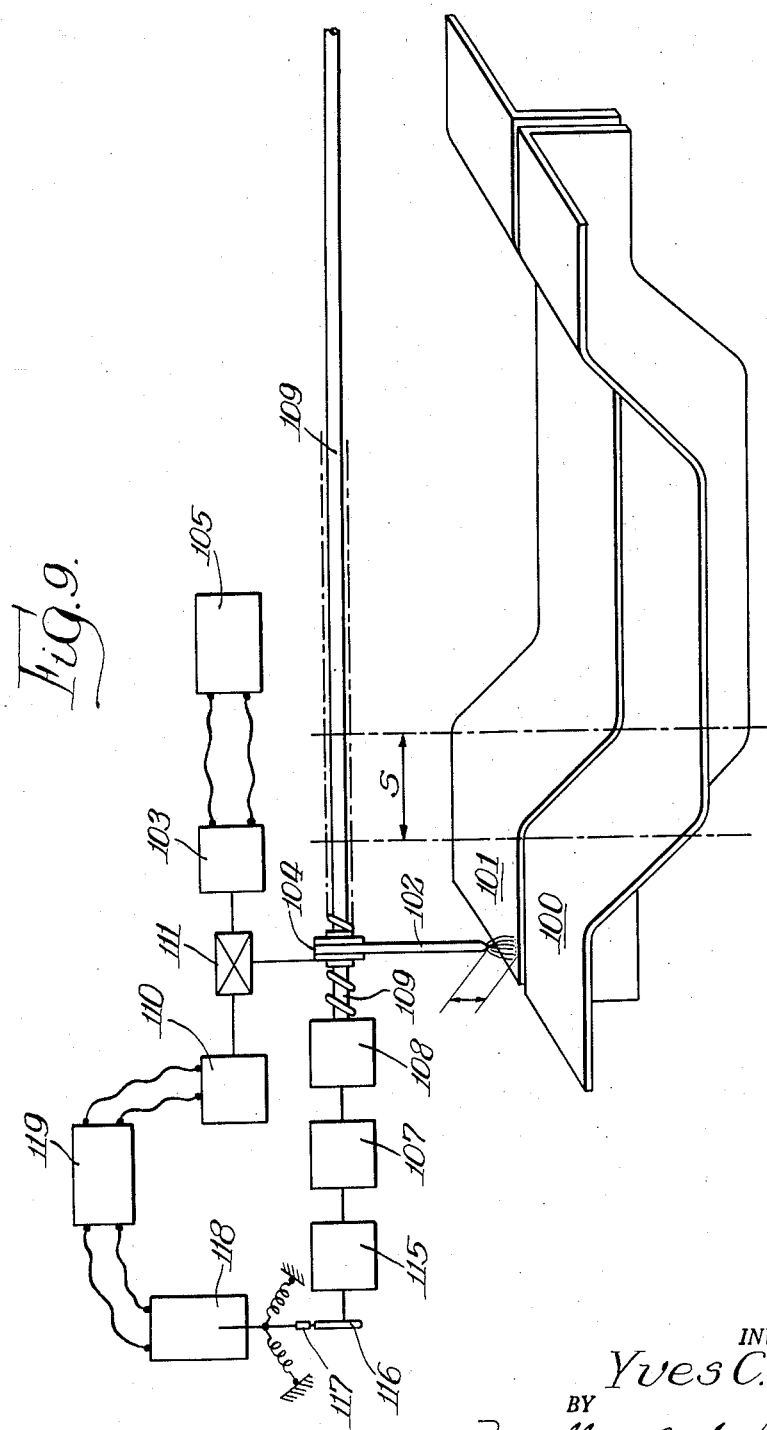

United States Patent Office 2,846,638
Patented Aug. 5, 1958

2,846,638

MOTOR CONTROL SYSTEM

Yves C. Suel, Paris, France, assignor to Welding Research, Inc., Chicago, Ill., a corporation of Illinois Application October 19, 1953, Serial No. 387,017

2 Claims. (Cl. 321—38)

This invention relates generally to an automatic control system for manufacturing apparatus or machines, and more particularly to an improved automatic system for providing variations in the cyclic movement of a member during the performance of a manufacturing operation.

Processes are known which control the cyclic motion of a work piece with respect to the working tool in a machine in which the position of one of these, the work piece for example, is automatically controlled according to some given conditions. Also known are controlling systems, called servo mechanisms, in which the position of the output is controlled according to the difference between the actual position and the desired position. This difference is called the error function. Such a servo mechanism is undesirable from several standpoints, such as inability to control parameters other than that which is defined by its error. For example, an error of position can control only the position of a part, and an error of speed can control only the speed. However, in many cases, it is necessary to control a parameter different than that which determines the value of this parameter.

It is, therefore, an object of the present invention to provide an improved system for controlling the movement of a tool with respect to a work piece on which an operation is being performed.

A further object of this invention is to provide an electrical system for controlling the movement of one member in a machine so that movement thereof is varied as the machine goes through various portions of the operation being performed.

A further object of this invention is to provide a system for controlling the movement of a part of a machine having substantially no inertia or time delay so that the movement instantaneously and accurately follows a desired law.

A feature of this invention is the provision of a machine for performing an operation on a work piece in which the work piece and a tool are separately moved, with one movement being controlled automatically as the operation progresses so that the movement thereof is varied throughout the performance of the operation.

A further feature of this invention is the provision in a machine for performing an operation on a work piece including separate driving means for the work piece and a working tool operating thereon of a control system including a cam and follower coupled to one driving means and providing varying movement during the performance of the operation which movement operates electrical controls governing the operation of the other driving means. The cam follower may be moved along a cam by the first driving means to provide a movement of the follower, or the cam may rotate to cause movement of the follower, with the cam in either case being designed to compensate for inertia of the system so that instantaneous accurate control is provided.

Another feature of this invention is the provision of a control system for controlling an electric motor operating one part of a machine, with the control being provided by a mechanical movement which is utilized to control the energy applied to the motor. A three-phase motor may be used with power fed thereto through a cyclo-converter which instantaneously controls the energy applied to the motor. The cyclo-converter may be controlled by pulses developed in coils positioned in a three-phase field, with the coils being moved linearly within the field by the mechanical movement to thereby control the current supplied to the motor by the cyclo-converter.

Further objects, features and the attending advantages of the invention will be apparent from a consideration of the following description when taken in connection with the accompanying drawings, in which:

Fig. 1 illustrates a copying lathe in accordance with the invention;

Fig. 2 illustrates the phase control device for the cyclo-converter;

Fig. 3 is a schematic view of one of the windings of the system of Fig. 2;

Fig. 4 is a cross section view along the lines 4—4 of Fig. 2;

Fig. 5 illustrates a wire mesh making machine in accordance with the invention;

Fig. 6 is a top view illustrating the operation of the wire mesh machine;

Fig. 7 illustrates the operating mechanism for the machine;

Fig. 8 illustrates the design of the cam for controlling the machine; and

Fig. 9 illustrates the application of the invention to a welding machine.

In practicing the invention a machine is provided for performing a particular operation on a work piece wherein the work piece is moved in one manner (either linearly or rotary) and a tool is moved in another manner with respect to the work piece. The combined movements of the work piece and tool cause the particular operation desired to be performed. Control means are provided for one movement for providing variations in the movement as the operation is performed. The control means is coupled to the other driving means so that variations are produced in synchronism with the operation of such other driving means. The variation in movement may be provided either in the movement of the work piece or of the tool.

The control is provided through a direct current motor driven from a three-phase alternating current source through a cyclo-converter. The current fed to the motor is precisely controlled by the cyclo-converter to thereby control the instantaneous speed of the motor. The cyclo-converter is controlled by a cam and follower arrangement operating from the machine, with the cam being constructed to provide different operation of the controlled motor as the cycle of the machine proceeds. The cam follower operates a phase shifting device, providing linear mechanical movement of coils positioned in a three-phase field to thereby control the phase of pulses developed in the coils which are applied to the cyclo-converter.

The control system is suitable for use in many varied applications. It is applicable for use in a copy lathe where the speed of movement must be controlled in accordance with the slope of the contour of the various parts of the piece being operated on. Another application is in a machine for making wire mesh wherein the speed of the shuttle may be greater between the ends of the movement than at the ends thereof. A still further application is in a welding machine wherein the spacing of the electrodes may preferably be varied with changes in the thickness of the portions being welded.

One application of the control system of the invention is in duplicating machines such as axle-following copying lathes which contain two spindles turning in synchronism, one driving in its rotation the pattern to be reproduced, and the other the part to be machined. Such a duplicating machine is represented in Fig. 1 and includes a spindle 1 driving the part 2 to be machined. This spindle has a rotating motion due to the action of motor 3. This spindle drives in its rotating motion a second spindle 4, holding the pattern 5 in such a way that the motion of the two spindles are identical. A cross-slide 6 is linked by hydraulic follower 7 to tracer head 8 which stays permanently in contact with pattern 5. The lathe includes well known means for providing longitudinal movement of the cross-slide or follower head in a direction parallel to the axes of the spindles 1 and 4. The outline of the pattern 5, that is, the piece to be reproduced, is followed by tracer head 8 which, through the hydraulic follower 7, impresses to the cross-slide 6 in a direction perpendicular to the axis of spindle 1, a back and forth motion such that the cross-slide 6 edge of the cutting tool stays at a constant distance from the point of tracer head 8. The outline of the pattern is therefore followed by the tracer head and the alternating motion thereof is applied to the edge of the cutting tool.

In such duplicating machines in which the speed of rotation of the spindle and the speed of longitudinal displacement of the cross-slide are constant, when the tool is moved radially of the spindle beyond a certain radial speed, the accuracy of the duplicator in following the pattern does not have an acceptable tolerance. An error in copying is made which is very nearly proportional to the speed of the displacement of the cross-slide. This error, above a certain speed, increases very rapidly in such a way that the deformation on the part being machined becomes very large; thus, for a given part the radial speed and hence the speed of the spindle must be fixed at a maximum value which would be compatible with the speed possibilities of the copying system.

It is evident that these speeds are a function of the shape of the part to be machined, thus when the speed of the rotation of the spindle is constant, it is necessary in the manufacturing to choose a speed compatible with the most difficult part to be machined in such a way that for a less difficult part one has to work at a speed inferior to that which could have been used. This results in an important loss of time.

According to this invention, the drive of spindles 2 and 4 is made at a variable speed compatible with the maximum allowable instantaneous speed as a function of the nature of the cutting tool, of the difficulties of the contour of the part to be machined, the material being machined, and the performance of follower 7. The instantaneous alternating speed of the tool, called radial speed $V_R$, is a function of two factors:

(1) The speed $V_S$ of the spindle.
(2) The outline of pattern 5.

To have an error less than a fixed value, it is necessary that hydraulic follower 7 work below a maximum speed; hence, pattern 5 being determined, the optimum speed of the spindle is determined. More particularly the speed of rotation of the two spindles 1 and 4 is variable, and the longitudinal displacement of the cross-slide and hence of the tracer head is very nearly in a constant ratio with respect to the speed of the spindle.

To control the variable speed of rotation of spindles 2 and 4, spindle 4 drives in its rotating movement cam 10 whose outline is a function of the instantaneous speed that it is desired to impose at every instant upon spindles 1 and 4. Follower 11 cooperates with this cam by acting through oscillating lever 12 around axis 13 on device 14 acting on a speed control system 15, which in its turn acts to control the instantaneous speed of motor 3, driving spindles 1 and 4. As will be explained later on, the outline of the cam is, according to this invention, determined to take into account the various inertia of the machine and in particular the electrical and mechanical inertia.

It is obvious that various constructions can be provided for motor 3 as well as its regulating system, and the system of control of the regulation as a function of the outline of cam 10. In the application of the invention shown, motor 3 is an electric motor fed by a direct current derived from a source of poly-phase alternating current. The motor is fed from a variable direct current network 15, generally called a cyclo-converter, energized from the source of three-phase current provided by conductors 20, 21 and 22. The variation of the voltage of this direct current network, controlling the variation of speed of motor 3 is obtained by the device 14 which is controlled by the outline of cam 10.

The three-phase source feeds primaries 25a, 25b and 25c of a transformer having secondaries 26a, 26b and 26c. These secondaries are connected in Y and the common point 27 is connected to one of the terminals 28 of motor 3. The other terminal 29 is connected through a filter inductance 30 to the common point of cathodes 32a, 32b and 32c of the gas tubes 33a, 33b and 33c, with one tube operating in each phase. The plates 34a, 34b and 34c of the tubes are brought respectively to the output terminals of the secondaries 26a, 26b and 26c of the transformer. The control grids 35a, 35b and 35c of the tubes are biased by a common biasing device 36, and are individually connected to coils 37a, 37b and 37c respectively of the phase shifting network 14 which allows for a variation of the phase of the firing of the tubes with respect to the phase of the supply so as to control the current supplied to motor 3. This group of three tubes allows the supply of current to the motor only in one direction.

Motor 3 can in a similar manner be fed by another group of three tubes 40a, 40b and 40c connected in such a way that the polarity of the current through motor 3 is opposite to the polartiy of the current furnished by the first group of tubes 33a, 33b and 33c, thus it is possible to reverse the rotation of the motor. However, the second group of tubes which could reverse the rotation of the motor is used only to brake it. Here the braking is obtained by reversal of the system provided by the inverse rectifiers. Each of these two groups of three tubes can play either part, allowing a bilateral power exchange between the supply network and the motor. The second group of tubes 40a, 40b and 40c has a common plate point which is connected to terminal 29 of motor 3 through the filter inductance 31. The cathodes 41a, 41b and 41c of these tubes are connected respectively to the coils of secondaries 26a, 26b and 26c of transformer. Grids 42a, 42b and 42c are each biased by a biasing device 43a, 43b and 43c respectively and by one of coils 44a, 44b and 44c of the same phase shifting circuit as that used for the first group of gas tubes. It is therefore seen that in this device by changing the voltages on the control grids, it is possible to obtain a variable direct current supply, giving positive or negative acceleration to the motor.

It is desired to control the speed of rotation of the spindles as a function of the outline of cam 10 through control of the phase shifting network 14. The phase shifting circuit may be of any construction which provides satisfactory control from the cam 10 with a minimum of the play and inertia. The phase shifting must be a function of the displacement of a physical element operated from the cam 10.

A phase shifting circuit suitable for use in the system is shown in Figs. 1 to 4. It consists of two fixed magnetic circuits 50 and 51, each producing magnetic fields rotating in opposite direction and obtained in a manner similar to that of the coils of non-synchronous motors. These two magnetic circuits are placed on each side of the block of laminations 160 and separated from it by insulators which determine a certain air gap 161. Each magnetic circuit contains a core having therein slots 53, as shown on Figs. 2, 3 and 4, which figures also indicate the method of lamination of this magnetic circuit. These slots receive for each phase two groups of coils 54a, 54b for phase 1; 55a, 55b for phase 2; and 56a, 56b for phase 3. The position of the coils is shown in Fig. 3.

In the example under consideration, since coil 56b is an end coil, it is necessary to place at the other end another coil 56c which belongs to phase 3 which constitutes the second end coil. This would not be required if the winding were on a cylindrical armature.

As best shown in Fig. 2, the movable coils of the phase shifting device are mounted on plate 58 to move between the two magnetic circuits 50, 51. It consists of two groups of coils 37a, 37b and 37c placed on the non-magnetic metal plate 58 and movable with reference to the magnetic circuit 50. These coils are connected to the grids of gas tubes or thyratrons 33 of the device of Fig. 1. A second group of coils $44_1$, $44_2$ and $44_3$ placed with reference to the magnetic circuit 51 are connected to the grid circuits of the group of thyratrons 40.

Each coil is mounted on a core 57 made of quickly saturable material so that pulses of voltage instead of sine waves are obtained which allows better precision in the triggering of the thyratrons. Each core 57 is fixed on the mounting plate 58 which runs between guides 52 and is controlled by lever 12, oscillating around its axis 13. The magnetic flux of the fixed magnetic circuit goes through the pole piece 50 or 51, the cores 57 and through its extremity to the block 160. According to the position of the moving part 58 in relation to fixed magnetic circuits 50 and 51, voltage pulses are obtained on the terminals of coils 37a, 37b and 37c on one part and 44a, 44b and 44c on another part. These voltage pulses have predetermined phase shift in relation with the power line voltage, and the shape of sharp voltage pulses when the cores of the moving part are made of quickly saturable material.

As shown in Fig. 2, the moving part 58 is directly tied to the end of lever 12 whose other end engages cam follower 11 which bears on cam 10. Spring 59 pushes steadily against follower 11 on the side cam. The articulation between the end of lever 12 and moving part 52 is achieved by the toggle joint 60. This setup gives a very precise instantaneous position of moving part 58 with respect to the outline of cam 10, hence giving a very precise firing time of the thyratrons controlling the voltage feeding D. C. motor 3 which drives the spindles.

It should be known that cam 10 could be made out of a stack of several two dimensional cams staggered one above the other in such a way that follower 11 which drives the phase shifting device comes automatically in contact with the profile of the stack which corresponds to the position of the cutting tool in the cross-section being machined, this cross-section varies progressively while the different machining parts are made. Further, the rotating cam 10 could be replaced by a stationary cam surface if the pattern is a surface of revolution. The spacing between the point of tracer head 8 and follower 11 stays constant so that the follower moves along the cam as the machine operation progresses.

This invention therefore provides a duplicating machine wherein the instantaneous speed of rotation of the part being machined is accurately controlled. The tool moves longitudinally parallel to the axis of rotation of the part being machined. The axial movement of the tool is controlled by a tracer head which is held in contact with the pattern to be reproduced. A speed control cam is rotated with the part being machined and the pattern, and has a three dimensional cam surface which is shaped in a manner related to the configuration of the part to be produced. A cam follower engages this surface to control the speed of rotation of the spindle so that the speed increases when the machining is more difficult. This arrangement makes it possible for the machine to work under the most efficient conditions, compatible with the difficulties of the part to be machined, the possibility of the copying device, and allowable error tolerances. This greatly accelerates the average speed of machining and hence increases the production of the machine.

The invention may also be applied to machines used to manufacture wire mesh similar to that used in armored glass. Such a machine is shown in Figs. 5, 6 and 7 and includes a device used to distribute the weft wire 67. This wire is stretched on the teeth 63 of the chain 62 driven by the slotted wheels 61. The wire is distributed by means of a shuttle 64 moving back and forth along horizontal guides 65. This shuttle 64 includes wheels 66 which pull the weft wire 67 and loop it at each end of its turn under the teeth 63 of the bearing chains. The looping of the wire 67 around the teeth is realized according to the manner shown on Fig. 6. The dot and dash line 68 represents the path of the shuttle 64. As is apparent, the shuttle 64 contains a slide part 69 on which the wheels 66 are fastened. Spring 70 holds this mechanism upward.

When the shuttle, in this back and forth motion, arrives in the neighborhood of the teeth, the spring 17 is squeezed and then at the end of the strokes of the shuttle, this spring is free. By this action the wire 67 is looped around the teeth 63 of the bearing chain. This mechanism is known in the art and is therefore not shown in detail.

This shuttle is driven by a rack (Fig. 7) having an alternating motion which is given by means of a crank and connecting rod mechanism. It is apparent that the shuttle 64 moves at a speed whose movement with respect to time is sinusoidal if the motor which drives the machine rotates at a constant speed. Because of the sinusoidal law, the speed of the shuttle 64 when arriving at the end, slows down, stops and starts in the opposite direction, thus obtaining the desired effect. However, when the speed of rotation of the driving motor is increased, it is possible for the wire to jump and not hold onto the teeth 63 of the bearing chain. In other words, the maximum speed of the machine is limited by this. In order to have the machine working in the most efficient manner, it would be necessary to slow down the driving motor during this dangerous period.

It is possible by using the general idea of this invention to increase the average speed of this machine. For this purpose such a frame would be characterized by a speed control device as previously described and in which a cam turns at a speed in direct relation with the longitudinal speed of motion of the machine, and controlling the instantaneous speed of displacement of the said machine. This arrangement makes it possible to slow down the machine at the time the wire should be looped.

Considering now the improved arrangement for driving the shuttle 64, as previously stated, the shuttle slides on guides 65. It is driven by chain 71 which passes about wheel 72 which is fitted on the shaft of pinion 73. The shuttle 64 is connected to the chain 71 by arm 88. This pinion is engaged with the rack 74 which moves back and forth through the crank and connecting rod mechanism 75 and 76. Finally, motor 78 drives the frame through speed reducer 77. The weaving of the weft wire 67 with the warp 79 may be achieved by known means and is therefore not illustrated. As an example, resistance welding may be used, or any other suitable means. At the end 80 of the frame, the wire mesh is unhooked from the teeth and wound on spool 81.

As already stated, shuttle 64 moves with a sinusoidal law of speed, if motor 78 turns at a constant speed. In order to obtain the most efficient operation of the frame, motor 78 is run at a modulated speed instead of a constant speed. This speed is adjusted by the same process which is used in the copying lathe; that is, a phase shifting device 82, mechanically driven, controlling the cyclo-converter connected both to the power supply and motor 78. Cam 84 performs the same function as the cam in the copying lathe and is fitted on the same shaft as crank 76. Cam 84 drives phase shifting device 82 through follower 85 and lever 86.

Assuming that the speed decreases when the radius of cam 84 decreases, it is evident from Fig. 7 that the needed deceleration is obtained. To obtain the outline of cam 84, it is necesary to operate as follows:

The equation of equilibrium of a rotating system is $$Cm - Cr = K\frac{dw}{dt}$$

$Cm$ = motor torque $Cr$ = backward torque $K\frac{d}{dt}$ = inertia torque with $w$ = angular speed of the shaft $K = \frac{Pd^2}{4g}$ = moment of inertia of the rotating parts refer to the shaft of the motor $P$ = weight of the rotating parts $d$ = diameter of gyration $g$ = acceleration of gravity The curve of speed vs. time which must be impressed on motor 78 is known. The law of the transmission of the motion which makes it possible for every given position of the cam to obtain a given position of the phase shifting device 82 is also known. Starting with these elements and knowing the relation between the speeds of the motor 78 for each position of the phase shifting network 82, the trace of the theoretical cam can be determined graphically or mathematically (according to whether the information is given graphically or in the form of mathematical formulas), without taking into account the inertia and friction (Fig. 8).

By referring to the above equation, K is a known constant, $$\frac{dw}{dt}$$

is known, being the angular acceleration which must be given to the motor in order for it to go from speed $w_0$ which it has at time $t_0$ to speed $w_1$ which it has at time $t_1$. $C_r$ is known and is equal to the friction torque; hence $C_m$ is determined at any instance and is equal to:

$$C_m = K\frac{dw}{dt} + C_r$$

In this case the motor acts as a receiver ($C_m$ positive; that is, motor torque). Also, $$C_m = K\frac{dw}{dt} - C_r$$

in case the motor acts as a generator ($C_m$ negative; that is, braking torque).

The parameter $C_m$ so determined is the difference ($r$) which shall exist at an instant between the actual position of the phase shifting device and that which it should have if the speed of the motor at this particular instant is uniform and already established. In other words, if the friction and inertia of the machine were zero. One of these differences appears on Fig. 8 as A, B.

The contour, drawn in a continuous line in Fig. 8, represents the cross-section of a theoretical cam (as defined previously), rotating in the direction of arrow F. The contour, drawn in a dot and dash line, represents the modification which should affect cam 84, according to the previously explained process, taking into account the inertia and friction of the machine. The increasing radius R corresponds to an increasing speed and vice versa. Evidently, the contrary could be provided without changing anything in the principles explained. The concentrical parts DOC in Fig. 8 to the center O axis of rotation of the cam, correspond to a constant speed of motor 78 (fixed position of the phase shifting device) and hence are concentrical to the corresponding outline of the theoretical cam, the difference in radius being used to create the positive torque necessary to balance the friction torque. If the speed variations of wheel 72 during repeating cycles were not identical, it should be necessary to use a comoide which could be obtained by stacking of the cams, as mentioned previously. This is the same as the preceding case.

The application of the invention to a welding machine is illustrated in Fig. 9. In this machine the pieces to be welded together, 100 and 101, has been represented in perspective. The electric current goes from the electrode 102 to pieces 100 and 101. The electric arc established between electrode 102 and pieces 100 and 101 to be assembled, passes the welding current. Motor 103 drives the capstan 104 feeding electrode 102. Motor 103 is controlled by the regulator 105 which acts in such a way that the speed of the motor 103; that is, the speed of electrode 102, is so adjusted that the voltage of arc 106 will stay constant. Furthermore, motor 107 drives through speed reducer 108 and at constant speed the threaded shaft 109, and so gives a constant feed (as understood in a milling machine) to capstan 104. Motor 103, as well as motor 110 which will be discussed later on, drive the differential 111 which controls the forward movement of capstan 104.

It is seen that along the length of segment S of shaft 109 the regulator 105 must assure not only the average forward movement of the electrode 102 which will form the arc weld, but also must insure the additional forward movement created by the forward motion of the two parts to be assembled 100 and 101 and vice versa. It has been found that in several cases this additional effort required by regulator 105 is beyond its possibilities and welding is stopped.

The present invention may be used to remedy the above situation. In the machine described previously, it is the machined part that is moved with a variable speed of rotation. On the other hand, in the machine shown in Fig. 9 which is to be used for welding two parts by an arc weld, it is the machining part or tool that has variable speed. It is necessary in this machine, in order to obtain the maximum efficiency, that the electrode 102, the machining part, be removed by a variable longitudinal displacement as a function of the outline of the parts to be assembled.

To this effect and according to this invention, motor 110 has been added to the machine which acts on the differential 111 in such a way that it automatically compensates for the speed of approach of electrode 102 in any point where the arc weld is not parallel to shaft 109. Under these conditions, regulator 105 will always operate under normal conditions.

To this effect, motor 107, which rotates shaft 109 drives reducer 115 which in turn drives cam 116 whose outline is a function of the outline of the parts to be welded. This outline is conveniently corrected to take into account the mechanical and electrical inertia as indicated previously. Follower 117 operates with cam 116 and controls the phase shifting device 118. This phase shifting device controls through the rectifier 119 the speed of motor 110 in such a way that the resulting speed given by the differential 111, which controls the rotation of capstan 104, takes into account the departure from the straight line of the weld with respect to shaft 109. In this way the voltage of the welding arc remains constant regardless of the shapes of parts to be assembled.

It is therefore seen that the invention is of general application, the three applications mentioned serving to illustrate the general utility thereof. The electrical control provides instantaneous action. In the structure shown the cyclo-converter is controlled from the mechanical movement produced by the cam and follower through a phase shifting arrangement of simple construction. This phase shifting arrangement changes the position of coils within a three-phase field to shift the position of pulses which control the cyclo-converter. Two sets of coils are provided; one controlling the forward motor action and the other the braking action so that very accurate control is provided.

There are several advantages of the phase shifting device utilized. The mechanical drive thereof from straight line motion is very easily suited to any mechanism. The device gives directly with great precision and without any inertia all the voltages which are needed to control an arc tube converter. It also gives directly a peaking voltage without the need of a peaking transformer.

Although certain embodiments of the invention have been illustrated and described, it is obvious that other embodiments may be provided within the inventive concept. It is intended to cover all such embodiments which fall within the scope of the appended claims.

I claim:

1. A system for providing from a three-phase alternating current source a direct current which varies in accordance with the movement of a member, said system including rectifier means connected to said source of three-phase alternating current, said rectifier means including a first group of three grid controlled rectifier elements each connected to one phase of said three-phase source to provide current of one polarity, and a second group of three grid controlled rectifier elements each connected to one phase of said three-phase source to provide current of the opposite polarity, and phase shifting means including a first group of three coils positioned in a first three phase field and individually coupled to the grids of said rectifier elements of said first group for applying voltage pulses thereto, a second group of three coils positioned in a second three-phase field moving in a direction opposite to said first field, said coils of said second group being individually coupled to the grids of said rectifier elements of said second group, said coils of said first and second groups being mechanically connected to said member and following said movement thereof to provide pulses of varying phase for controlling the conductivity of said rectifier elements and thereby controlling the direct current delivered thereby.

2. A system for providing from a three-phase alternating current source a direct current which varies in accordance with the movement of a member, said system including rectifier means connected to said source of three-phase alternating current, said rectifier means including a first group of three grid controlled rectifier elements each connected to one phase of said three-phase source to provide current of one polarity, and a second group of three grid controlled rectifier elements each connected to one phase of said three-phase source to provide current of the opposite polarity, and phase shifting means including a first group of three coils positioned in a first three-phase field and individually coupled to the grids of said rectifier elements of said first group for applying voltage pulses thereto, a second group of three coils positioned in a second three phase field moving in a direction opposite to said first field, said coils of said second group being individually coupled to the grids of said rectifier elements of said second group, said coils of said first and second groups including supporting cores mechanically connected to said member and following said movement thereof, said cores being formed of saturable material so that pulses of varying phase are developed in said coils for controlling the conductivity of said rectifier elements and thereby controlling the current delivered by said rectifier means.

References Cited in the file of this patent

UNITED STATES PATENTS

| | | |
|---|---|---|
| 1,939,455 | Livingston | Dec. 12, 1933 |
| 1,970,427 | Lewin | Aug. 14, 1934 |
| 2,276,752 | Willis | Mar. 17, 1942 |
| 2,288,339 | Willis | June 30, 1942 |
| 2,411,745 | Moyer | Nov. 26, 1946 |
| 2,437,603 | Hornfeck | Mar. 9, 1948 |
| 2,475,326 | Johnson | July 15, 1949 |
| 2,557,824 | Hornfeck | June 19, 1951 |
| 2,585,329 | Johnson | Feb. 12, 1952 |
| 2,629,844 | Eserkaln | Feb. 24, 1953 |

FOREIGN PATENTS

| | | |
|---|---|---|
| 686,191 | Germany | Jan. 5, 1940 |
| 709,234 | Germany | Aug. 11, 1941 |